Oct. 19, 1948.   L. A. DUNAJEFF   2,451,930
SYNCHRONIZED MOTOR CONTROL
Filed Jan. 17, 1945
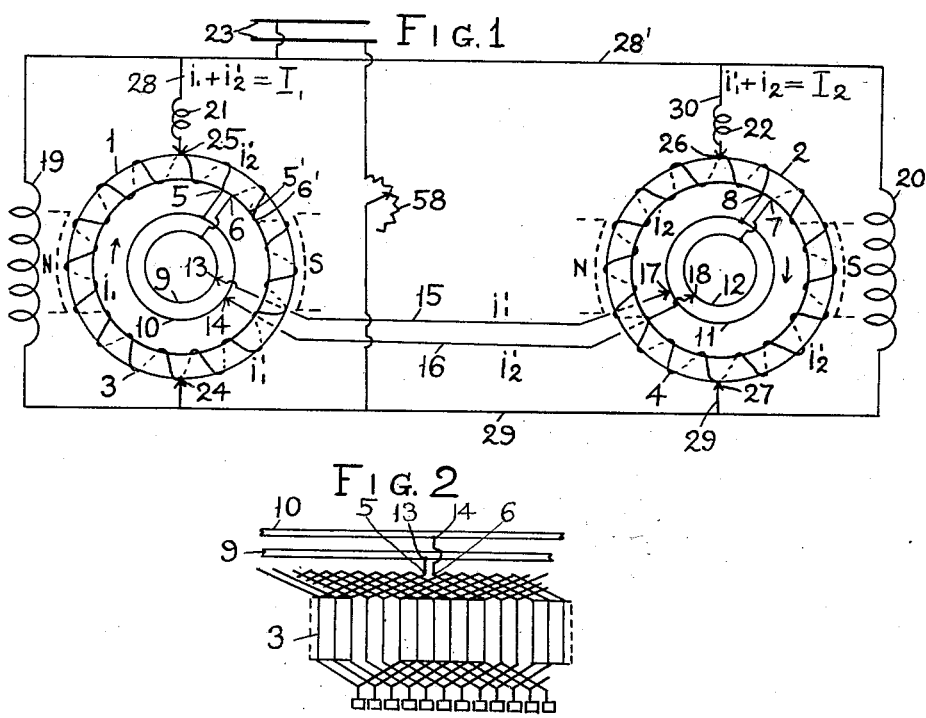
LEONID A. DUNAJEFF
INVENTOR.
BY John P. Mironow
ATTORNEY Patented Oct. 19, 1948

2,451,930

UNITED STATES PATENT OFFICE 2,451,930

SYNCHRONIZED MOTOR CONTROL

Leonid A. Dunajeff, Havre de Grace, Md.

Application January 17, 1945, Serial No. 573,245

4 Claims. (Cl. 318—43)

My invention relates to systems and methods of synchronizing electric motors and has particular reference to arrangements for causing one motor to control the speed of the other motor.

My invention has for its object to provide means for maintaining synchronous rotation of two motors in such a manner that the second motor maintains at all times the same speed as the first motor, regardless of the variations in speed of the first motor, and regardless of any variations of the load of the second motor.

Another object of my invention is to provide means to synchronize two electric motors in such a manner that the shaft of the second motor follows the angular displacements of the shaft of the first motor. With my system it is possible, therefore, to cause a load to be placed in any desired angular position or to cause the load to make a desired number of revolutions and to stop in a desired angular position.

These and other objects, features and advantages of my invention are more fully described in the accompanying specification and drawings in which—

Fig. 1 is a diagrammatic view of two motors whose armature windings are interconnected for synchronous rotation;

Fig. 2 is a developed view of the armature winding of one motor.

My system of synchronized electric motors, as shown by way of example in Fig. 1, consists of two identical motors 1 and 2 whose armature windings 3 and 4 are disconnected at corresponding points 5, 6 and 7, 8. The free ends of the windings are connected to contact or slip rings 9, 10 and 11, 12, shown also in Fig. 2. Contact brushes 13, 14 of one motor are connected by leads 15, 16 with corresponding brushes 17, 18 of the other motor. Field magnets are shown with shunt windings 19, 20 and series windings 21, 22, although they may be provided with straight shunt or series windings. The shunt windings are directly connected by leads 28, 29 to a source of electric current 23, the series windings being connected in series with the armatures as shown through commutator brushes 24, 25, and 26, 27. The armature windings are therefore interconnected so that the current passes through both sets of windings in a closed circuit. Thus, the current $i_1$, as a portion of the total current, divided at terminal 24, will pass from the terminal 24 through the left portion of the armature of the motor 1 to the terminal 25 and through the series winding 21 and lead 28 to the source of current 23, while the other portion of the current $i_1'$ will pass through the portion 24—6 of the armature 1 to the contact point 6, brush 13 and through the lead 15, brush 17, brush 8, portion 8—26 of the armature of the motor 2, brush 26, series coil 22 and lead 30 to the source of current 23.

Similarly, the current $i_2$ of the armature 2 passes through the brush 27, then through its left portion 27—26, brush 26, the same series coil 22, and lead 30 to the source of current 23, while the current $i_2'$, on the right side of armature 2, starting from the brush 27, will pass through the portion 27—7 of the armature 2 to the collector brush 18, lead 16, brush 14, and portion 5—25 of the armature 1, series coil 21, and lead 28 to the source of current 23. Thus, the combined current $i_1+i_2'=I_1$ will pass through the series coil 21, and the combined current $$i_2+i_1'=I_2$$

will pass through the series coil 22, the sum $I_1+I_2=I$ being the total current passing through both motors. The combined currents $I_1$ and $I_2$ will vary, depending on the relative sizes of the arcs 25—5, 24—6, 26—8 and 7—27. Thus, for example, if the armature 1 is accelerated, the points 5 and 6 will be shifted to positions 5' and 6', while the armature 2 for a moment will maintain its constant speed, so that the arc 26—8 will remain unchanged, then $$i_2=\frac{E-e_2}{r_2} \quad \text{and} \quad i_2'=\frac{E-e_2'}{r_2'}$$

where $e_2$ is counter-electromotive force in the arcs 24—6'+26—8, $r_2$ is ohmic resistance corresponding to these arcs, and $e_2'$ and $r_2'$ are respective values for the counterelectromotive force and resistance of the arcs 27—7+25—5'. Normally, when both motors are running synchronously, $e_2=e_2'$ and $r_2=r_2'$, since the corresponding angular velocities remain equal. When the dividing points are shifted, however, at different angles, $e_2$ and $r_2$ will decrease; thus, $i_2$ will be correspondingly increased while $e_2'$ and $r_2'$ will be accordingly changed, decreasing the current $i_2'$. As a consequence, the magnetic field of the motor 1 will be weakened and the magnetic field of the armature 2 will be strengthened, correspondingly reducing the speed of the motor 1, thus counteracting the effect of the shifting of the points 5 and 6, increasing at the same time the speed of the motor 2, thus forcing both motors to run synchronously if the electrical characteristics have been properly calculated.

Obviously, my system can be varied for different practical applications. It can be used for synchronizing motors in remote control installations, also for speed control, transmission of angular displacements, periodic or harmonic movements, etc., and for any other applications in which it is necessary to maintain exact synchronism of two motors.

While the invention has been described in detail with respect to a particular preferred example, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent is:

1. An electric system comprising a pair of electric motors, each motor having a field winding and an armature winding, the armature winding being disconnected at one point, the ends of the armature winding of one motor being connected to the ends of the armature winding of the other motor, the two windings with their connections forming a single closed circuit; a stationary set of brushes slidably engaging the armature winding of each motor at diametrically opposite points; and electrical connections for independently energizing each pair of the brushes and the field windings for causing the two motors to rotate.

2. An electric system comprising a pair of electric motors, each motor having a field winding and an armature winding, the armature winding being disconnected, the ends of the armature winding of one motor being connected to the ends of the armature winding of the other motor, the two windings with their connections forming a closed circuit; stationary brushes slidably engaging the armature windings of each motor; and means to independently energize the armatures and the field windings for causing the motor to rotate, the armature windings being so connected together as to cause one armature to rotate in synchronism with the other armature.

3. An electric system comprising two motors; an open rotary winding at each motor, the ends of the two windings being connected together in a closed circuit; means to connect the closed circuit with a source of electric current and with the other windings at each motor, the connections being so made as to divide each winding into variable portions and to maintain the balance of electromagnetic forces in the respective variable portions when the two motors rotate in synchronism with each other, and to cause the forces to be unbalanced when one motor changes its speed, thereby causing the motors to return to the synchronous rotation.

4. An electric system comprising two motors having armature windings, the ends of the windings of the two motors being connected together into a closed circuit; stationary contact brushes connecting the circuit with a source of electric current and with other motor windings, the connections being so made as to produce balanced electromagnetic conditions in the motors when the motors rotate in synchronism with each other, and to cause the motors to maintain the synchronism against forces tending to cause a deviation from the synchronism.

LEONID A. DUNAJEFF.

REFERENCES CITED

The following references are of record in the file of this patent:

UNITED STATES PATENTS

| Number | Name | Date |
| --- | --- | --- |
| 1,292,768 | Harle | Jan. 28, 1919 |
| 1,828,272 | Ashbaugh et al. | Oct. 20, 1931 |

FOREIGN PATENTS

| Number | Country | Date |
| --- | --- | --- |
| 335,882 | Great Britain | Sept. 25, 1930 |